United States Patent
Devins et al.

(10) Patent No.: US 9,367,493 B2
(45) Date of Patent: Jun. 14, 2016

(54) METHOD AND SYSTEM OF COMMUNICATING BETWEEN PEER PROCESSORS IN SOC ENVIRONMENT

(75) Inventors: Robert J. Devins, Essex Junction, VT (US); David W. Milton, Underhill, VT (US); Pascal A. Nsame, Colchester, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 3050 days.

(21) Appl. No.: 11/275,091

(22) Filed: Dec. 9, 2005

(65) Prior Publication Data

US 2006/0075209 A1 Apr. 6, 2006
US 2007/0136559 A1 Jun. 14, 2007

(51) Int. Cl.
G06F 15/173 (2006.01)
G06F 13/24 (2006.01)
G06F 15/17 (2006.01)

(52) U.S. Cl.
CPC .............. *G06F 13/24* (2013.01); *G06F 15/17* (2013.01)

(58) Field of Classification Search
CPC .......... G06F 13/24; G06F 15/17; G06F 15/00; G06F 15/76
USPC ................. 709/208, 209, 210, 211, 212, 213; 712/2, 10, 12, 24, 32
See application file for complete search history.

(56) References Cited

U.S. PATENT DOCUMENTS

| | | | |
|---|---|---|---|
| 3,786,430 A | 1/1974 | Hajdu et al. | |
| 4,583,222 A | 4/1986 | Fossum et al. | |
| 4,873,656 A | 10/1989 | Catlin | |
| 4,959,781 A | 9/1990 | Rubinstein et al. | |
| 5,097,412 A | 3/1992 | Orimo et al. | |
| 5,167,023 A | 11/1992 | Nicolas et al. | |
| 5,193,187 A | 3/1993 | Strout, II et al. | |
| 5,283,902 A * | 2/1994 | Dorn ............................. | 710/121 |
| 5,283,904 A | 2/1994 | Carson et al. | |
| 5,301,302 A | 4/1994 | Blackard et al. | |
| 5,488,713 A | 1/1996 | Norton et al. | |
| 5,711,643 A | 1/1998 | Parr et al. | |
| 5,805,867 A | 9/1998 | Kodaira | |
| 5,862,366 A | 1/1999 | Schmidt et al. | |
| 5,923,887 A * | 7/1999 | Dutton ......................... | 710/260 |
| 6,014,512 A | 1/2000 | Mohamed et al. | |

(Continued)

FOREIGN PATENT DOCUMENTS

JP 62157961 7/1987
JP 04-148461 A 5/1992

(Continued)

OTHER PUBLICATIONS

*OS and Compiler Considerations in the Design of the IA-64 Architecture*—Zahir, R. et al.; 2000.

(Continued)

*Primary Examiner* — Cheikh Ndiaye
(74) *Attorney, Agent, or Firm* — David Cain; Andrew M. Calderon; Roberts, Mlotkowski, Safran & Cole PC (57) ABSTRACT

A method and system comprises transferring data from a first processor to at least one pulse generator directly connected to an interrupt control of at least a second processor. The transferring of the data bypasses memory. The method further includes reading the transferred data directly from the at least one pulse generator by the at least a second processor.

25 Claims, 8 Drawing Sheets

(56) References Cited

U.S. PATENT DOCUMENTS

| | | | |
|---|---|---|---|
| 6,115,763 A | 9/2000 | Douskey et al. | |
| 6,154,785 A * | 11/2000 | Lakhat et al. | 719/310 |
| 6,199,031 B1 | 3/2001 | Challier et al. | |
| 6,208,954 B1 | 3/2001 | Houtchens | |
| 6,321,181 B1 | 11/2001 | Havens | |
| 6,467,082 B1 | 10/2002 | D'Arcy et al. | |
| 6,510,531 B1 | 1/2003 | Gibbons | |
| 6,606,676 B1 | 8/2003 | Deshpande et al. | |
| 6,625,679 B1 | 9/2003 | Morrison et al. | |
| 6,633,940 B1 | 10/2003 | Alasti et al. | |
| 6,718,294 B1 | 4/2004 | Bortfeld | |
| 6,732,338 B2 | 5/2004 | Crouse et al. | |
| 6,904,398 B1 | 6/2005 | Panesar | |
| 6,937,611 B1 * | 8/2005 | Ward | 370/462 |
| 7,664,928 B1 * | 2/2010 | Andrews et al. | 712/14 |
| 2002/0083387 A1 | 6/2002 | Miner et al. | |
| 2004/0176059 A1 * | 9/2004 | Hayem et al. | 455/168.1 |
| 2007/0067528 A1 * | 3/2007 | Schaffer et al. | 710/116 |

FOREIGN PATENT DOCUMENTS

| | | |
|---|---|---|
| JP | 9073435 | 3/1997 |
| JP | 09-325946 A | 12/1997 |

OTHER PUBLICATIONS

*On Processes and Interrupts*—Gerrity, GW.; 1981.
*Synchronizing Processors with Memory-Content-Generated Interrupts*—Hill, JC.; 1973.
*A Scalable and Flexible Data Synchronization Scheme for Embedded HW-SW Shared-Memory Systems*—Gangwal, OP. et al.; 2001.

* cited by examiner

METHOD AND SYSTEM OF COMMUNICATING BETWEEN PEER PROCESSORS IN SOC ENVIRONMENT

FIELD OF THE INVENTION

The invention relates to a method and system of communicating between processors, and more particularly, to a method and system of communication between multiple processors in a SoC test and verification environment.

BACKGROUND DESCRIPTION

Present-day integrated circuit (IC) chips have advanced significantly in both complexity and sophistication. For example, in early generation chip designs, a chip might embody relatively simple electronic logic blocks effected by interconnections between logic gates; whereas, newer generation chips include designs having combinations of complex, modularized IC designs often called "cores", which together constitute an entire SoC. These newer generation IC designs increase the overall functionality and performance characteristics of the chip, itself, by, for example, having the ability to include smaller feature sizes and thus increasing the amount of circuitry which can be built on a single chip. But, this comes at a cost: longer design and verification times which, in turn, translate into added development and manufacturing costs.

The verification phase of chip design has moved toward a software simulation approach to avoid the costs of implementing designs in hardware to verify the workability of such designs. However, multiprocessor and multicore designs can lead to very large simulation models. Even when using modern simulation tools, simulation load and execution time, as well as build time can become cost and time prohibitive. This is especially true in complex design cases with inter-processor clusters since a complete gate level representation of the design must be constructed and loaded into the simulation for each processor.

As the chip design becomes more complex, the verification tends to require an even more inordinate amount of time and computing resources, largely due to the modeling and verification of the interaction of functions associated with the design. This verification process becomes more complicated for verification of multi-processor cores, which interact with one another. These inefficiencies in current verification methodologies exacerbate time pressures and increase, significantly, the time-to-market, a key factor for developers and marketers of IC chips in being competitive in business.

To effectuate the growing trend towards SoC implementations of IC using multiprocessor platforms, SoC systems use tightly coupled software programs and processes running in independent peer processors. These independent execution units must be able to communicate with one another in a timely manner. However, in currently known implementations, communication is through mailbox/semaphore mechanisms to implement inter-process communication (IPC) protocols. Such mechanisms tend to be non-deterministic with respect to message delivery time, and are often not sufficient for real-time SoC functionality.

Figure 1:
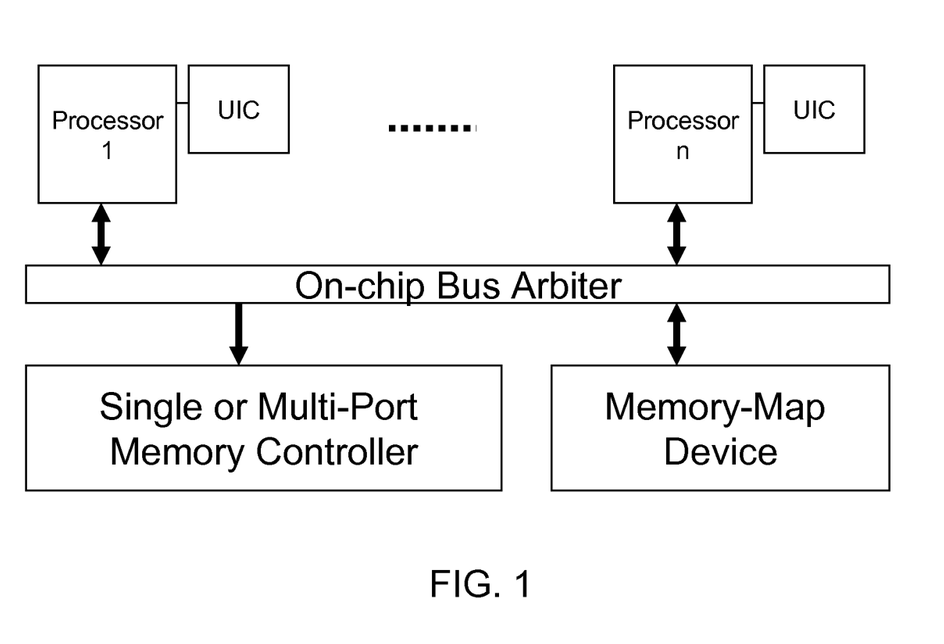
FIG. 1 is a block diagram describing current state of the art.

By way of example, and referring to FIG. 1, processors 1 through n communicate with each other through an on-chip chip bus arbiter, via a UIC (universal interrupt controller). The system of FIG. 1 additionally includes a single or multiple port memory controller and network controller in communication with the on-chip bus arbiter. In implementation, hundreds of cycles may pass before there is full data transfer between the processors (or other logic), thus impairing real-time communications. In the example of FIG. 1, processor 1 transfers data to processor "n" by first requesting authorization from the arbiter. Once this is granted, data is written into memory. Processor 2 polls the system and requests authorization from the arbiter to read the data from the memory. Once authorization is granted, processor "n" uploads the data for read operations. This same process would also occur for non-interrupt network controllers. This, of course, can take many hundreds of cycles to perform, taking into account the arbiters role of prioritizing data transfer between many devices.

SUMMARY OF THE INVENTION

In a first aspect of the invention, a method comprises transferring data from a first processor to at least one pulse generator directly connected to an interrupt control of at least a second processor. The transferring of the data bypasses memory. The method further includes reading the transferred data directly from the at least one pulse generator by the at least a second processor.

In further embodiments, the method includes transferring of the data and reading of the transferred data is in real-time in a multiprocessor SoC design. The transferring step is provided in a single clock cycle. The reading step is provided in a single clock cycle. The method further includes, in embodiments, providing write access directly to the at least one pulse generator. The transferring data includes sending interrupts to the first processor or at least a second processor through the at least one pulse generator. The method further includes, in embodiments, obtaining authorization from an arbiter to begin the transferring of data. The reading of the transferred data is directly from the at least one pulse generator. The transferring of the data and reading of the transferred data is at least (i) processor to processor data traffic, (ii) processor to enabled interrupt device data traffic and (iii) processor to non-enable interrupt devices data. In further embodiments, the method further includes partitioning the at least one pulse generator such that each partition is dedicated to at least one of separate functions and separate processors. The method can be used to fabricate an integrated circuit chip and distributing of the integrated circuit chip.

In another aspect of the invention, the method includes obtaining application and ordering requirements and selecting at least one channel, an arbitration algorithm and an interrupt type. Upon completion of the obtaining and selecting step, the method includes sending a complex message over a bus to a pulse generator and reading, by a processor, the complex message directly from the pulse generator.

In further embodiments, the obtaining the application requirement is at least one of an application code, data transmission rates, and amount of time and data type to transmit. The selecting the channel includes selecting all channels if there is a broadcast message or one or more channels if there is no broadcast message. The selection of the one or more channels is based on at least a partitioning of the pulse generator. The selecting of the arbitration algorithm provides priority to the complex message. The selecting of the interrupt type is one of a fast interrupt type, a normal interrupt type or a non-maskable interrupt type.

The method further includes the pulse generator:
  decoding the complex message and the interrupt type;
  applying the arbitration algorithm and register ordering requirement;
  registering the at least one channel; and upon completion of the decoding, applying and registering steps, applying the ordering requirement.

The reading step is provided after the above steps performed by the pulse generator. The reading of the transferred data is in real time.

In another aspect of the invention, the system includes at least two processors connected to a bus system and at least one pulse generator connected to the bus system and each of the at least two processors. The at least one pulse generator is a write-only device receiving data from the at least two processors which has bypassed memory, and the at least two processors read data directly from the at least one pulse generator, bypassing the memory.

In further embodiments of the system the at least one pulse generator is equal to an amount of the at least two processors. The at least one pulse generator is equal to or less than the number of the at least two process and equal to or greater than 1. The bus system is an on-chip bus arbiter or an on-chip crossbar/switch. The at least one pulse generator is connected directly to an interrupt controller of each of the at least two processors. In further embodiments, at least one interrupt enabled device and one non-interrupt enabled device write data directly to the at least one pulse generator. The at least one pulse generator is partitioned for at least one of each of the at least two processors, functions and a combination thereof. The at least one pulse generator is a single pulse generator connected to the at least two processors.

In yet another aspect of the invention, the system includes peer processors connected to a bus system. At least one pulse generator receives data over the bus system and is connected to an interrupt control of the peer processors such that data from one of the peer processors is read directly from the at least one pulse generator by the one of the peer processors or another of the peer processors.

In embodiments, the at least one pulse generator is a write-only device receiving data from the one of the peer processors. The at least one pulse generator bypasses memory such that the one or the another of the peer processors read data directly from the at least one pulse generator, bypassing the memory. The at least one pulse generator is equal to or less than the number of the peer processors and equal to or greater than 1, and the at least one pulse generator is partitioned such that the partition is dedicated to one or more of the peer processors, functions or a combination thereof. The bus system can be an on-chip bus arbiter or an on-chip crossbar/switch.

In a further aspect of the invention, a computer program product comprises a computer useable medium including a computer readable program. The computer readable program when executed on a computer causes the computer to provide a signal in one clock cycle to a pulse generator. The signal has data associated therewith. A processor reads the data directly from the pulse generator in one clock cycle and bypasses memory.

DETAILED DESCRIPTION OF EMBODIMENTS OF THE INVENTION

The invention relates to a method and system of communicating or transferring data between multiple (peer) processors in a system-on-chip (SoC) design verification environment. In an embodiment of the invention, the system and method uses a hardware device that sits as a slave on a bus system (e.g., on-chip bus, on-chip crossbar/switch, et.) which includes the peer processors as masters, enabling each processor write access to this hardware device. The hardware device is a write-only device which maps bits in a word to output ports, and which minimizes the amount of time to communicate data to the processors and any shared resources. Thus, in one implementation, the system and method provides a structure for interrupt-based IPC signaling between peer processors in a real-time, multiprocessor SoC design. For instance, if a bus system is a 32 bit bus, the writeable entity on hardware device will be any number of 32 bit words. Each bit in each word has a built-in pulse generator such that if a "1" is written to this bit, a pulse is driven out on its corresponding port. If there are two 32 bit words, there would be a total of 64 pulses which can be generated. These pulses can be connected as interrupts to the processors.

In implementation, this enables any processor to send any combination of interrupts to any processor(s), including itself. There is sufficient interlocking inside the hardware device such that if two processors attempt to send interrupts at the same time, the result is deterministic; the bus system will guarantee ordering of the write operations to the hardware device, and the hardware device, itself, will complete the first set of pulses(s) commanded by the first write before accepting the second write operation, so that it can generate the second set of pulse(s) independent of the first set. For example, in such case, a processor may receive two pulses relatively close together and the processor's interrupt controller will maintain a record. The pulse duration is one clock cycle of the clock driving hardware device, and the minimum width between two pulses is also one clock cycle of the hardware device's clock.

Figure 2:
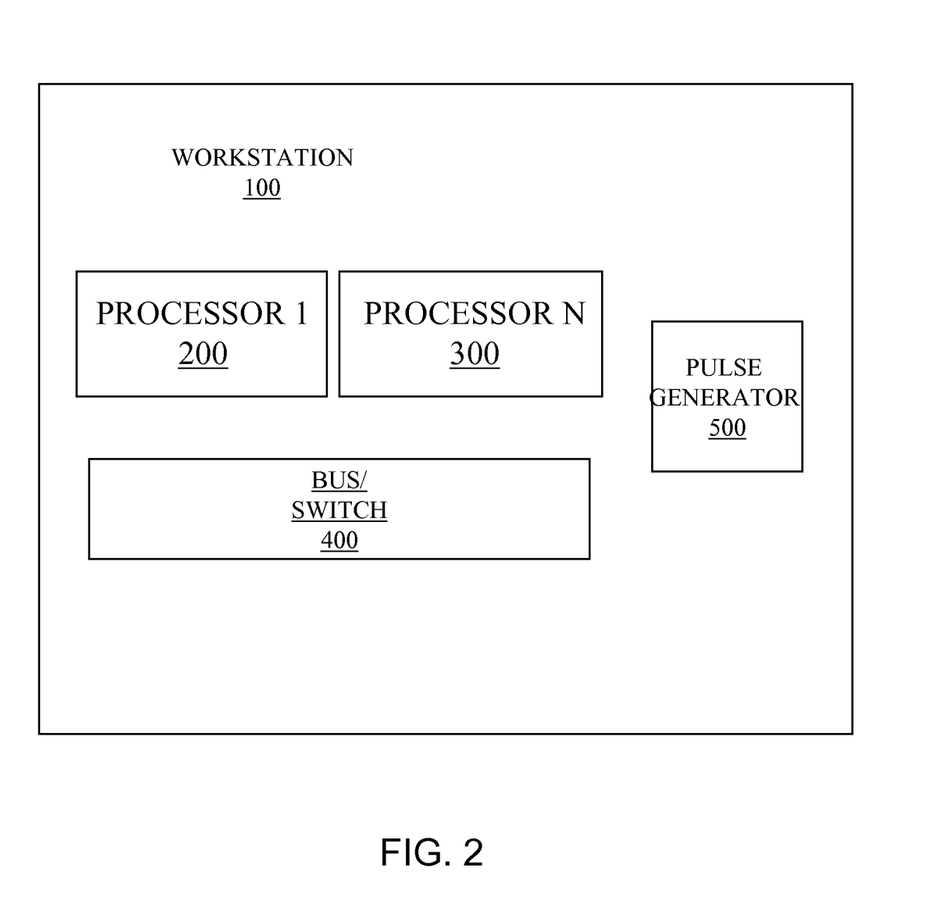
FIG. 2 shows an environment which implements aspects of the invention.

FIG. 2 shows a block diagram implementing the features of the invention. In particular, FIG. 2 shows one or more workstations denoted as reference numeral 100. The one or more workstations 100 include a memory, one or more peer processors 200, 300 and other well-known components. It should be understood by those of skill in the art that any number of processors are contemplated by the invention, and hence the designation "n" is provided with reference to processor 300. In one implementation of the invention, the one or more workstations 100 include a shared bus (or switch) 400 to support inter-TOS protocols. (AutoTOS™ (or ADF (Application Definition File) (where software resources are specified)) may be used to compile user specified parameters (e.g., resources) in order to generate a specific test to verify.)

Still referring to FIG. 2, the one or more workstations 100 additionally include one or more pulse generator (PGEN) 500. The PGEN 500 is arranged to connect to the interrupt inputs of each processor in the SoC. In different implementations, a single PGEN 500 may be associated with all of the processors;

a single PGEN may be associated with each of the processors; or there may be an equal number or less of PGENs than processors (but greater than one).

In the embodiments, data can be transmitted directly between the peer processors 200, 300, via the PGEN 500, thus bypassing memory.

By way of one illustration, the processor 200 can generate a request to the bus 400 to transfer data to processor 300. Once the request is granted, the processor 200 will transfer data directly to the PGEN 500; that is, the data will be written directly into the PGEN 500. The processor 300 can now read the data directly from the PGEN 500 (i.e., directly connected to the interrupt control of the processor(s), bypassing memory). In this manner, data can be transferred between processors in real-time and the data transfer, in preferred implementations, will also be deterministic. This example is applicable between at least (i) processor to processor data transfer, (ii) processor to enabled interrupt device data transfer and (iii) processor to non-enable interrupt devices data transfer.

Figure 3:
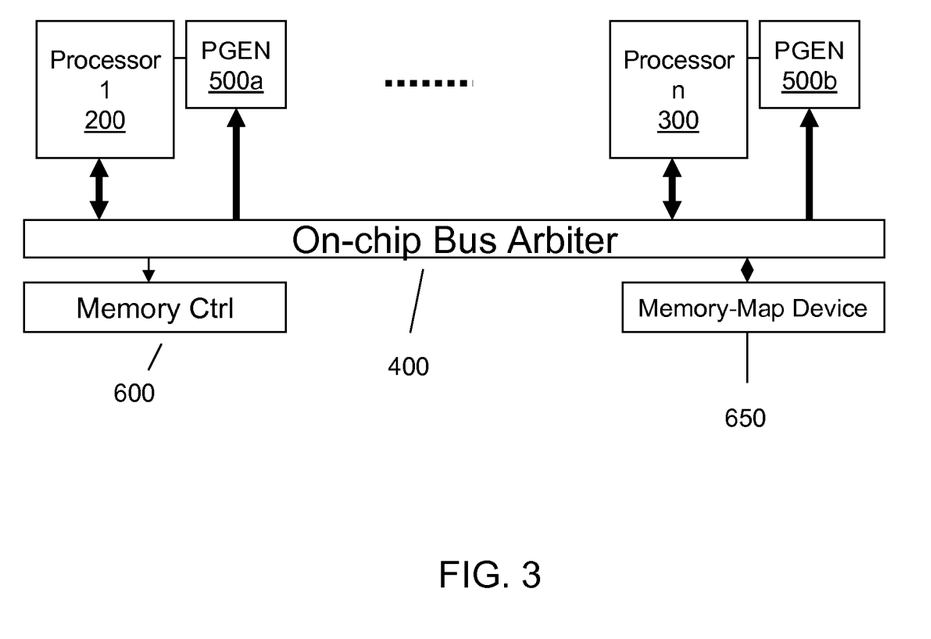
FIG. 3 shows a block diagram of an embodiment implementing the system and method of the invention.

FIG. 3 shows an illustrative example of the invention which may equally be representative of a flow diagram showing steps of the invention. In this example, processors 1 through n, e.g., 200, 300, are in data communication with the on-chip bus arbiter 400, in embodiments via a 32 bit, 64 bit, 128 bit, etc. channel. A separate PGEN is in data communication with the each of the processors 1 . . . n. For example, PGEN 500*a* is in data communication with the processor 200; whereas, the PGEN 500*b* is in data communication with processor 300. As should thus be understood, FIG. 3 represents any number of processors n in data communication with the on-chip bus arbiter 400, and an equal number of PGENs each of which are directly connected to the interrupt control of a respective processor. A memory controller 600 and memory map device 650 are also in data communication with the on-chip bus arbiter 400.

In the example of FIG. 3, in one non-limiting illustrative example, processor 1, 200, is desirous of transferring data to processor "n", 300. In this example, processor 1, 200, requests authorization from the on-chip bus arbiter 400 to transfer data to processor "n", 300. Upon obtaining such authorization, the processor 1, 200, will write data directly to the PGEN 500*b*, eliminating the need for a shared memory or processor "n", 300, having to poll the system and request its own authorization to read data from a shared memory. Processor "n", 300, reads the data directly from the PGEN 500*b*. This same example can be implemented for any number of processors, each having their own PGEN.

Figure 4:
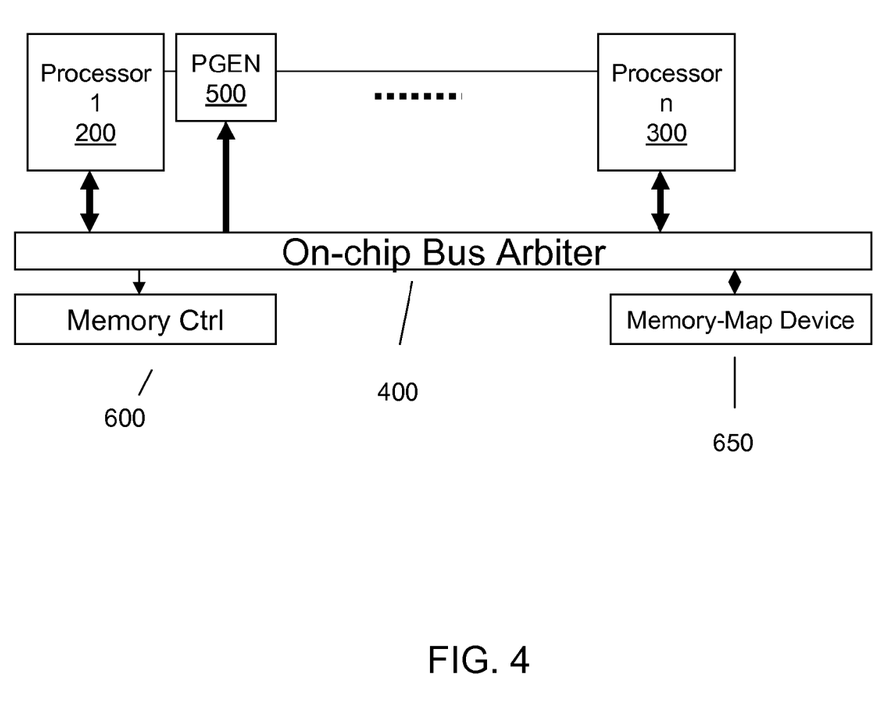
FIG. 4 shows a block diagram of an embodiment implementing the system and method of the invention.

FIG. 4 shows an illustrative example of the invention which may equally be representative of a flow diagram showing steps of the invention. In this example, processors 1 through "n", e.g., 200, 300, are in data communication with the on-chip bus arbiter 400, in embodiments, via a 32 bit, 64 bit, 128 bit, etc. channel. A single PGEN 500 is directly connected to the interrupt control of the processors 1 . . . "n". For example, PGEN 500 is in data communication with the processor 200 and processor 300. As should thus be understood, FIG. 4 represents any number of processors, n, in data communication with the on-chip bus arbiter 400, and a single PGEN is directly connected to the interrupt control of each of the processors. A memory controller 600 and memory map device 650 are also in data communication with the on-chip bus arbiter 400.

In the example of FIG. 4, in one non-limiting illustrative example, processor 1, 200, is desirous of transferring data to processor "n", 300. In this example, processor 1, 200, requests authorization from the on-chip bus arbiter 400 to transfer data to processor "n", 300. Upon obtaining such authorization, the processor 1, 200, will write data directly to the PGEN 500, eliminating the need for a shared memory and processor "n", 300, having to poll the system and request its own authorization to read data from a shared memory. Processor "n", 300, reads the data directly from the PGEN 500. This same example can be implemented for any number of processors, each sharing the PGEN 500.

Figure 5:
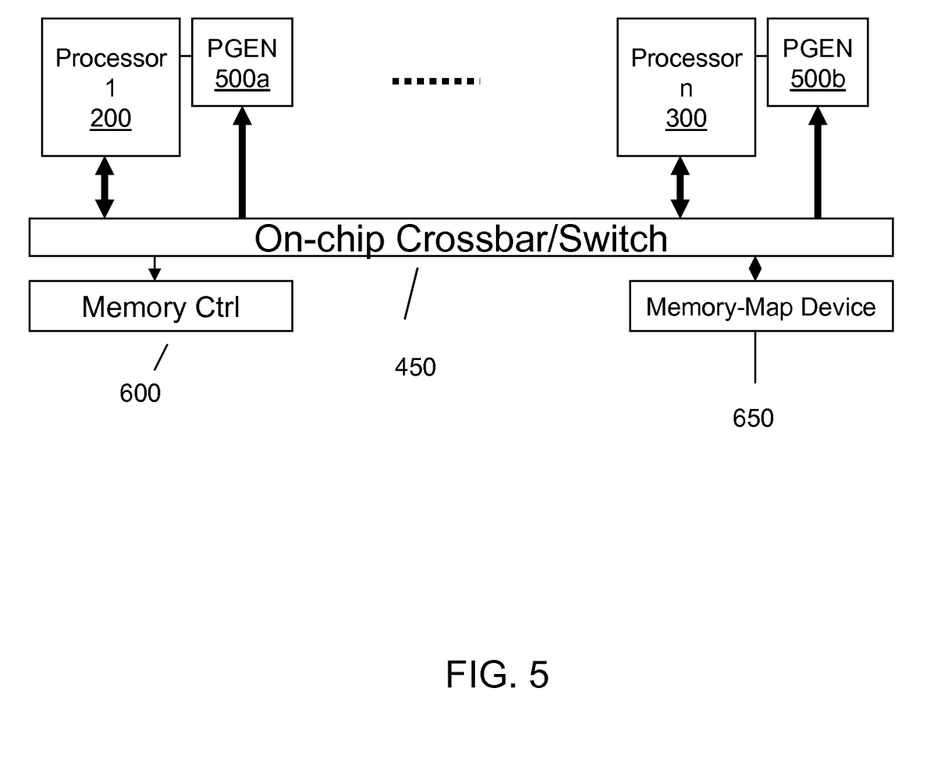
FIG. 5 shows a block diagram of an embodiment implementing the system and method of the invention.

FIG. 5 shows an illustrative example of the invention which may equally be representative of a flow diagram showing steps of the invention. In this example, processors 1 through "n", e.g., 200, 300, are in data communication with an on-chip crossbar/switch 800, in embodiments, via a 32 bit, 64 bit, 128 bit, etc. channel. The on-chip crossbar/switch 450 provides a non-blocking communication, e.g., allows more than one processor to transfer data at one time. A separate PGEN is directly connected to the interrupt control of each of the processors 1 . . . "n". For example, PGEN 500*a* is in data communication with the processor 200; whereas, the PGEN 500*b* is in data communication with processor 300. As should thus be understood, FIG. 5 represents any number of processors "n" in data communication with the on-chip crossbar/switch 800, and an equal number of PGENs each of which are directly connected to the interrupt control of the respective processor. A memory controller 600 and memory map device 650 are also in data communication with the on-chip bus arbiter 400.

In the example of FIG. 5, in one non-limiting illustrative example, processor 1, 200, is desirous of transferring data to processor "n", 300. In this example, processor 1, 200, requests authorization from the on-chip crossbar/switch 450 to transfer data to processor "n", 300. Upon obtaining such authorization, the processor 1, 200, will write data directly to the PGEN 500*b*, eliminating the need for a shared memory and processor "n", 300, having to poll the system and request its own authorization to read data from a shared memory. Processor "n", 300, reads the data directly from the PGEN 500*b*. This same example can be implemented for any number of processors, each having their own PGEN.

Figure 6:
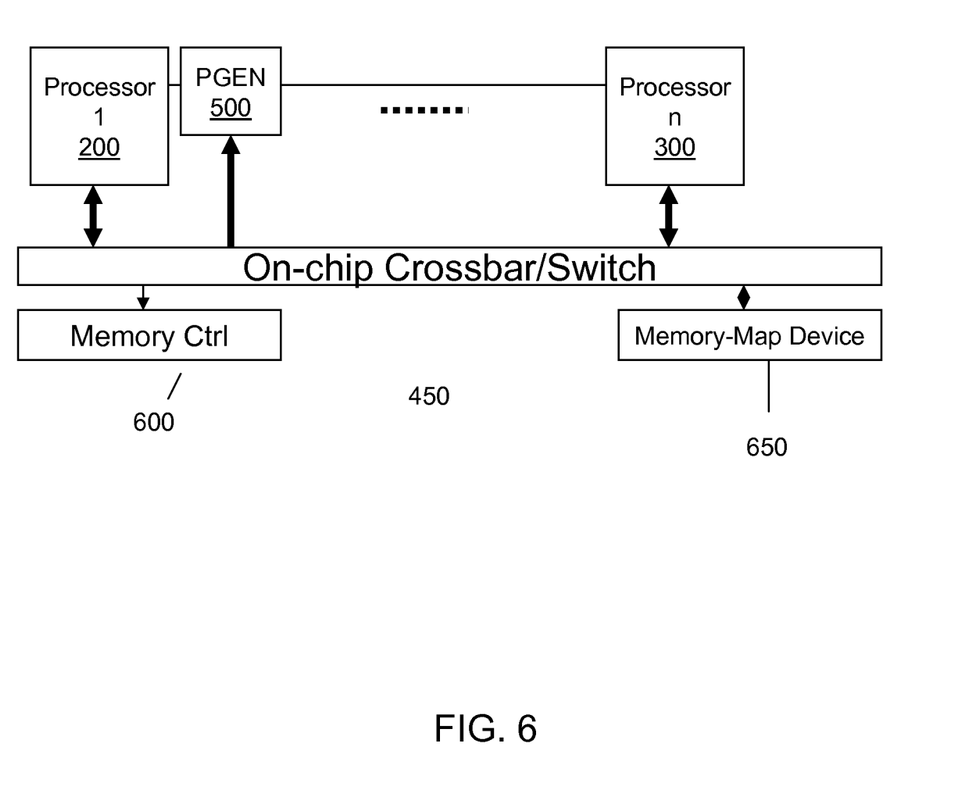
FIG. 6 shows a block diagram of an embodiment implementing the system and method of the invention.

FIG. 6 shows an illustrative example of the invention which may equally be representative of a flow diagram showing steps of the invention. In this example, processors 1 through "n", e.g., 200, 300, are in data communication with the on-chip crossbar/switch 800, in embodiments, via a 32 bit, 64 bit, 128 bit, etc. channel. A single PGEN 500 is in data communication with all of the processors 1 . . . "n", i.e., directly connected to the interrupt control of the processor(s). For example, PGEN 500 is in data communication with the processor 200 and processor 300. As should thus be understood, FIG. 6 represents any number of processors "n" in data communication with the on-chip crossbar/switch 800, and a single PGEN in direct data communication with each of the respective processors. A memory controller 600 and memory map device 650 are also in data communication with the on-chip bus arbiter 400.

In the example of FIG. 6, in one non-limiting illustrative example, processor 1, 200, is desirous of transferring data to processor "n", 300. In this example, processor 1, 200, requests authorization from the on-chip crossbar/switch 450 to transfer data to processor "n", 300. Upon obtaining such authorization, the processor 1, 200, will write data directly to the PGEN 500, eliminating the need for a shared memory and processor "n", 300, having to poll the system and request its own authorization to read data from a shared memory. Processor "n", 300, reads the data directly from the PGEN 500. This same example can be implemented for any number of processors, each sharing the PGEN 500.

In the examples of FIGS. 3-6, the number of PGENs may be optimally matched to the system requirements. For example, the PGEN 500 may be a 32 bit, 64 bit or 128 bit channel; although, other bit channels are also contemplated by the invention. By way of example, if there is a packet with 64 bits, it may be desirous to have a 64 bit data channel; although a 32 bit data channel (or less) is also possible, with the understanding that two or more cycles will be required for data transfer.

Also, other considerations to be taken into account are the number of processors associated with the system. So, for example, if there are one hundred processors, it may be advantageous to have more than one PGEN with one hundred connections. Instead, as an example, there may be four PGENs connected to the system, each with 25 connections, in addition to a 32 bit (64 bit, etc. channel to the bus.

It is also contemplated by the invention to have the PGEN partitioned such that a portion (partitioned section) of each PGEN is associated with a single or multiple processors or function(s). By way of example, a 32 bit PGEN can be partitioned into four partitions of 8 bits each, with each partition being responsible for a single processor and/or function. In this way, data can be written into a single partition of a single PGEN, which can be dedicated to a single processor (or multiple processors). The partitions can be repartitioned across any processor or within one processor such that, in one example, a single partition (8 bit channel) can be dedicated to all processors, with the remaining channels dedicated to variations of different processors and/or functions. Thus, depending on the system requirements, it is possible to reduce the number of PGENs to an optimal level. In the embodiments, it is contemplated that the number of PGEN is less than or equal to a number of processors and equal to or greater than 1.

In any of the above examples, using the PGEN of the present invention, structure is provided for interrupt-based IPC signaling between peer processors in a real-time, multiprocessor SoC design. Also, the use of the system and method of the present invention provides scalability, thus eliminating any concerns about providing additional processors and/or processes within the system. Accordingly, regardless of the amount of processors and/or processes, response time for the data transfer can be increased.

Figure 7:
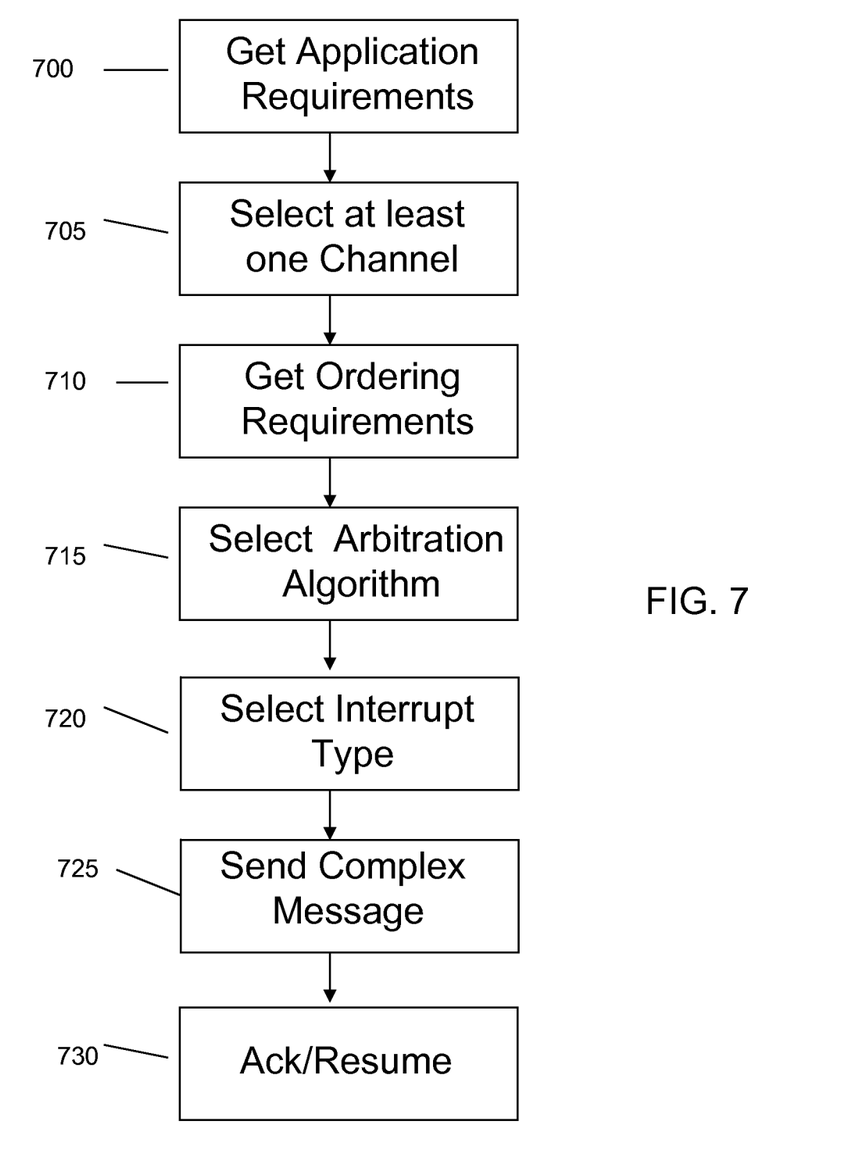
FIG. 7 is a flow diagram implementing steps of the invention.

FIG. 7 is a flow diagram implementing steps of the invention. FIG. 7 (and any other flow diagrams) may equally represent a high-level block diagram of the system, implementing the steps thereof. The steps of FIG. 7 (and FIG. 8) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to FIG. 7, at step 700, the sending processor obtains application requirements. These application requirements may be, for example, application code, data transmission rates, amount of time and data type to transmit. At step 705, the sending processor selects at least one channel to transfer data. For example, the sending processor may select all channels if there is a broadcast message; however, if there is not a broadcast message, the sending processor may select one or more channels. The selection of one or more channels may depend on such variables as the partitioning of the PGEN, the number of PGEN on the system, etc., all readily implemented by those of skill in the art. At step 710, the sending processor obtains ordering requirements. By way of example, if processor "A" would like to write data in a certain order (e.g., 1, 2, 3, 4 . . . ), the PGEN must comply with this ordering during the data transfer cycle.

At step 715, the sending processor will select the arbitration algorithm. This arbitration algorithm may provide priority to certain complex messages, e.g., priority to data transfer over the on-chip bus or on-chip crossbar/switch. This may be especially relevant when using the on-chip crossbar/switch since multiple communications can occur at the same time. At step 720, an interrupt type is selected. The interrupt type may be, for example, a fast interrupt type, a normal interrupt type or a non-maskable interrupt type, all known to those of skill in the art. At step 725, the complex message is sent over the bus (or switch) to the PGEN. At step 730, the receipt of the complex message is acknowledged. The step(s) described herein ensures that data is read in a priority order and that data from multiple processors are read in a deterministic manner.

Figure 8:
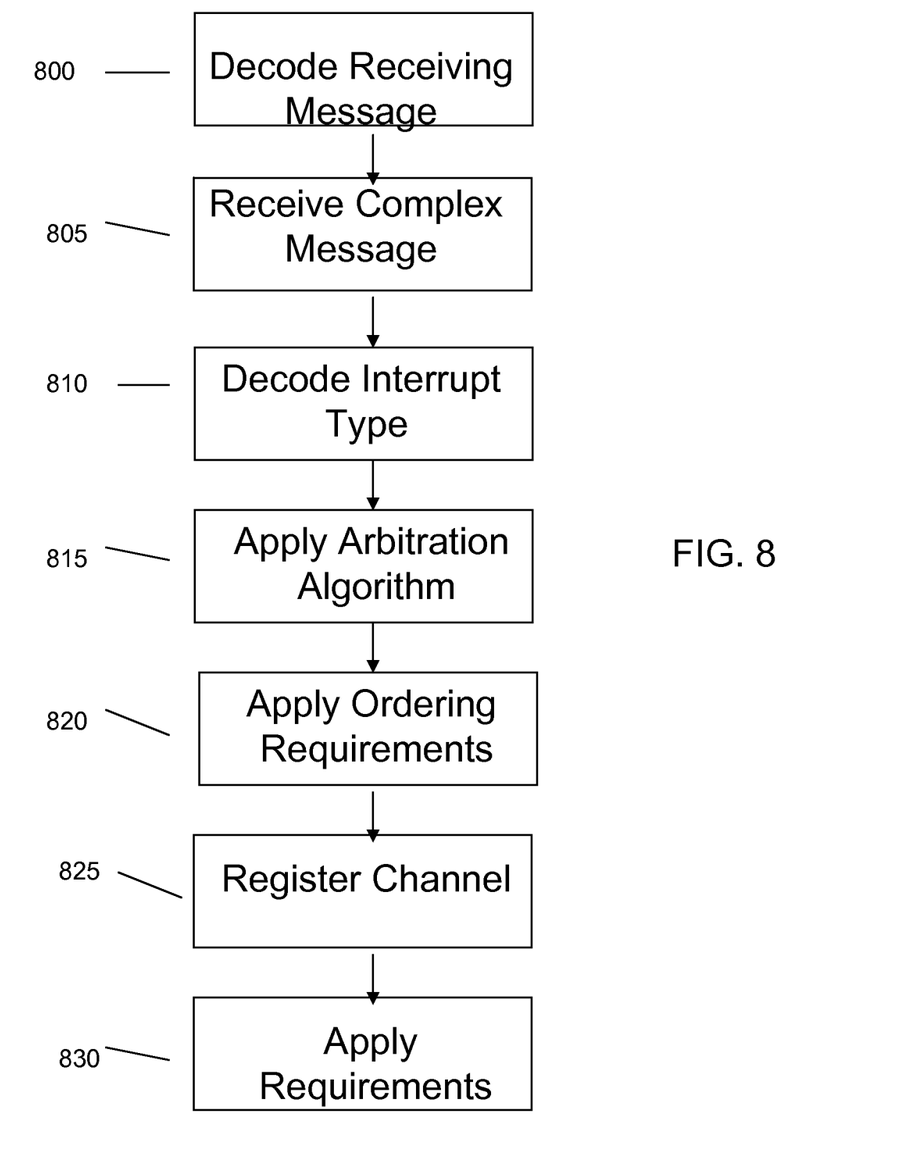
FIG. 8 is a flow diagram implementing step of the invention.

FIG. 8 is a flow diagram implementing steps of the invention. At step 800, the PGEN decodes the message. At step 805, the PGEN receives the complex message. At step 810, the PGEN decodes the interrupt type, e.g., fast interrupt type, normal interrupt type or a non-maskable interrupt type. At step 815, the PGEN applies the arbitration algorithm such that it can determine the priority given to the complex message. At step 820, the PGEN applies the register ordering requirement. At step 825, the PGEN registers the channel and, at step 830, the PGEN applies the ordering requirements. In this way, the PGEN can provide the information directly to the receiving processor in a reliable manner. Also, the step(s) described herein ensures that data is read in a priority order and that data from multiple processors are read in a deterministic manner.

Accordingly, the system and method of the invention provides a flexible hardware pulse generator, arranged to connect to the interrupt inputs of each processor in the SoC. The system of the invention provides the ability to issue complex, real-time messages between the processors in a multiple processor SoC design. The system and method of the invention further provides global access from each processor to any of the interrupt pulse controls, and allows for broadcast, sub-broadcast and individual shoulder taps, with automatic interlocking/deterministic mechanism. That is, the system and method of the invention ensures that data is read in a priority order and that data from multiple processors are read in a deterministic manner.

The method as described herein is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the invention has been described in terms of exemplary embodiments, those skilled in the art will recognize that the invention can be practiced with modifications and in the spirit and scope of the appended claims.

The invention claimed is:

1. A method comprising:
transferring data from a first processor to at least one a single pulse generator directly connected to an interrupt control of at least a second processor, the transferring of the data bypasses memory;
reading the transferred data directly from the at least one single pulse generator by the at least a second processor, wherein the first processor, the at least one single pulse generator, and the at least a second processor are directly connected to one of an on-chip bus arbiter and an on-chip crossbar/switch, and the single pulse generator is directly connected to the first processor and the at least a second processor; and
partitioning the single pulse generator such that each partition is dedicated to a different processor, of the first processor and the at least a second processor.

2. The method of claim 1, wherein the transferring of the data and reading of the transferred data is in real-time in a multiprocessor SoC design.

3. The method of claim 1, wherein the transferring step is provided in a single clock cycle.

4. The method of claim 1, wherein the reading step is provided in a single clock cycle.

5. The method of claim 1, further comprising providing write access directly to the at least one single pulse generator.

6. The method of claim 1, wherein the transferring data includes sending interrupts to the first processor or at least a second processor through the at least one single pulse generator.

7. The method of claim 1, further comprising obtaining authorization from an arbiter to begin the transferring of data.

8. The method of claim 1, wherein the reading of the transferred data is directly from the at least one single pulse generator.

9. The method of claim 1, wherein the transferring of the data and reading of the transferred data is at least (i) processor to processor data traffic, (ii) processor to enabled interrupt device data traffic and (iii) processor to non-enable interrupt devices data.

10. The method of claim 1, further comprising partitioning the at least one single pulse generator such that each partition is dedicated to at least one of separate functions and separate processors.

11. The method of claim 1, further comprising fabricating an integrated circuit chip using the method of claim 1.

12. The method of claim 11, further comprising distributing the integrated circuit chip.

13. A system, comprising:
at least two processors connected to a bus system; and
at least one pulse generator connected to the bus system and each of the at least two processors, wherein the at least one pulse generator is a write-only device receiving data from the at least two processors which has bypassed memory, and the at least two processors read data directly from the at least one pulse generator, bypassing the memory,
wherein the at least one pulse generator is a single pulse generator directly connected to the at least two processors, wherein the single pulse generator is partitioned such that each partition is dedicated to a different processor, of the at least two processors.

14. The system of claim 13, wherein the at least one pulse generator is equal to an amount of the at least two processors.

15. The system of claim 13, wherein the at least one pulse generator is equal to or less than the number of the at least two processors and equal to or greater than 1.

16. The system of claim 13, wherein the bus system is an on-chip bus arbiter or an on-chip crossbar/switch.

17. The system of claim 13, wherein the at least one pulse generator is connected directly to an interrupt controller of each of the at least two processors.

18. The system of claim 13, further comprising at least one interrupt enabled device and one non-interrupt enabled device which write data directly to the at least one pulse generator.

19. The system of claim 13, wherein the at least one pulse generator is partitioned for at least one of each of the at least two processors, functions and a combination thereof.

20. A system, comprising:
peer processors connected to a bus system; and
a single pulse generator receiving data over the bus system and connected to an interrupt control of the peer processors such that data from one of the peer processors is read directly from the single pulse generator by the one of the peer processors or another of the peer processors,
wherein the peer processors and the single pulse generator are directly connected to one of an on-chip bus arbiter and an on-chip crossbar/switch, the single pulse generator is directly connected to the peer processors, and the single pulse generator is partitioned such that each partition is dedicated to a different processor of the peer processors.

21. The system of claim 20, wherein the at least one pulse generator is a write-only device receiving data from the one of the peer processors.

22. The system of claim 20, wherein the at least one single pulse generator bypasses memory such that the one or the another of the peer processors read data directly from the at least one single pulse generator, bypassing the memory.

23. The system of claim 20, wherein the bus system is an on-chip bus arbiter or an on-chip crossbar/switch.

24. A computer program product comprising a non-transitory storage medium having readable program code embodied in the non-transitory storage medium, the computer program product includes at least one component when executed on a first processor causes the first processor to:
   provide a signal in one clock cycle to a single pulse generator, the signal having data associated therewith; and
   have a second processor read the data directly from the pulse generator in one clock cycle and bypassing memory,
   wherein the first processor, the single pulse generator, and the second processor are directly connected to one of an on-chip bus arbiter and an on-chip crossbar/switch, the single pulse generator is directly connected to the first processor and the second processor, and the single pulse generator is partitioned such that each partition is dedicated to a different processor, of the first processor and the second processor.

25. A system, comprising:
   at least two processors connected to a bus system; and
   at least one a single pulse generator connected to the bus system and directly connected to each of the at least two processors, wherein the at least one single pulse generator is a write-only device receiving data from the at least two processors which has bypassed memory, and the at least two processors read data directly from the at least one single pulse generator, bypassing the memory,
   wherein the at least two processors and the at least one single pulse generator are directly connected to one of an on-chip bus arbiter and an on-chip crossbar/switch, and the single pulse generator is partitioned such that each partition is dedicated to a different processor of the at least two processors.

* * * * *